(12) United States Patent
Shige et al.

(10) Patent No.: US 8,043,009 B2
(45) Date of Patent: Oct. 25, 2011

(54) HUB UNIT, HUB UNIT MANUFACTURING METHOD AND HUB UNIT TRANSPORTING METHOD

(75) Inventors: Yoshifumi Shige, Kashiba (JP); Arihiro Fujiwara, Nagoya (JP); Komatsugu Nishimura, Toyota (JP); Masatoshi Taniyama, Nisshin (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 1120 days.

(21) Appl. No.: 11/655,980

(22) Filed: Jan. 22, 2007

(65) Prior Publication Data
US 2007/0170773 A1 Jul. 26, 2007

(30) Foreign Application Priority Data
Jan. 23, 2006 (JP) ................. P2006-013307

(51) Int. Cl.
*F16C 32/00* (2006.01)
*B60B 27/00* (2006.01)
*B65D 85/58* (2006.01)
(52) U.S. Cl. ............... 384/448; 301/105.1; 206/318
(58) Field of Classification Search ............... 301/105.1; 206/318, 335; 384/448; 29/894.36, 894.361, 29/898, 898.11
See application file for complete search history.

(56) References Cited

U.S. PATENT DOCUMENTS

| | | | |
|---|---|---|---|
| 4,761,082 A | | 8/1988 | Gabelli |
| 6,127,819 A | * | 10/2000 | Ouchi ........................... 324/173 |
| 6,217,220 B1 | * | 4/2001 | Ohkuma et al. ............... 384/489 |
| 6,280,093 B1 | * | 8/2001 | Ohtsuki et al. ................ 384/448 |
| 6,287,009 B1 | * | 9/2001 | Nakamura et al. ............ 384/448 |
| 6,637,944 B2 | * | 10/2003 | Sahashi et al. ................ 384/544 |
| 6,851,862 B2 | * | 2/2005 | Gozdawa ....................... 384/121 |
| 6,971,177 B2 | * | 12/2005 | Ozawa et al. ............ 29/898.062 |
| 6,994,473 B2 | | 2/2006 | Nishibata et al. |

(Continued)

FOREIGN PATENT DOCUMENTS
EP 1 479 931 A2 11/2004
(Continued)

OTHER PUBLICATIONS
Machine translation of JP2002-106588, 9 pages.*
(Continued)

*Primary Examiner* — Jason R Bellinger
(74) *Attorney, Agent, or Firm* — McGinn IP Law Group, PLLC

(57) ABSTRACT

A hub unit is configured such that nitrogen gas, which functions as inert gas, is filled in a rolling element arranging space which is defined by an inner circumferential surface of an outer ring and an outer circumferential surface of a hub body for arranging rolling elements therein in such a manner as to be sealed therein in a semi-hermetically closed state by a seal member and a cover, so as to prevent the nitrogen gas from flowing out to an exterior space. The seal member, which is provided at an end portion of the rolling element arranging space which end lies on a vehicle-outer side, is formed as an elastic seal element, and is fixed to the outer ring at one end whereas being secured to the hub body at the other end thereof while being elastically deformed, whereby the seal member has a function to prevent the intrusion of water from the exterior space into the rolling element arranging space. This seal member prevents the inert gas filled in the rolling element arranging space from flowing out to the outside.

2 Claims, 7 Drawing Sheets

U.S. PATENT DOCUMENTS

| | | |
|---|---|---|
| 7,147,381 B2 | 12/2006 | Ohtsuki |
| 2003/0133635 A1 | 7/2003 | Nishibata et al. |
| 2004/0120622 A1* | 6/2004 | Tajima et al. .................. 384/544 |
| 2007/0169868 A1* | 7/2007 | Fujiwara ........................ 152/415 |
| 2007/0278118 A1* | 12/2007 | Pete et al. ..................... 206/318 |

FOREIGN PATENT DOCUMENTS

| | | |
|---|---|---|
| JP | 60-75441 | 5/1985 |
| JP | 62-297537 | 12/1987 |
| JP | 63-180726 | 11/1988 |
| JP | 8-133227 | 5/1996 |
| JP | 11-51064 | 2/1999 |
| JP | 2002-106588 | 4/2002 |
| JP | 2003-83498 | 3/2003 |
| JP | 2003-278774 | 10/2003 |
| JP | 2004-18725 | 1/2004 |
| JP | 2004-353710 | 12/2004 |
| JP | 2007232175 * | 9/2007 |

OTHER PUBLICATIONS

European Search Report dated Nov. 13, 2009.

Japanese Office Action dated Jun. 30, 2010 with English translation thereof.

Japanese Office Action dated Feb. 23, 2011 with an English-language translation thereof.

* cited by examiner

HUB UNIT, HUB UNIT MANUFACTURING METHOD AND HUB UNIT TRANSPORTING METHOD

BACKGROUND OF THE INVENTION

1. Field of the Invention

The present invention relates to a hub unit, a method for manufacturing the hub unit and a method for transporting the hub unit.

2. Related Art

Conventionally, hub units for mounting a wheel and a brake disc are used on vehicles such as automobiles.

When vehicles such as automobiles are transported by cargo-trains or boats etc., minute vibrations are subjected to hub units mounted on the vehicles, whereby fretting wear is generated, producing wear dust, this producing false brinelling on raceway portions. Then, wear dust is oxidized to become iron oxide, and iron oxide so produced promotes the wear further, resulting in expansion of false brinelling.

As preventive measures, clearance filling is implemented. In addition, a technique is disclosed in which a high-frequency heat treatment is applied to a portion on a surface area of a hub body which lies from an inner ring raceway surface to a root portion of a flange so as to form a hardened portion thereon (JP-A-11-51064).

When a vehicle equipped with a hub unit in which false brinelling was generated by fretting wear during transportation is run, abnormal noise is generated. While false brinelling affects the life of a hub unit, such a clearance filling by itself cannot suppress sufficiently the occurrence of fretting wear. Further, the hardening treatment as suggested in JP-A-11-51064 calls for an increase in production costs.

SUMMARY OF THE INVENTION

A problem that the invention is to solve is to provide a hub unit which prevents the occurrence of fretting wear due to vibrations occurring during transportation so as to prevent the generation of false brinelling on a bearing raceway portion, a method for manufacturing the hub unit and a method for transporting the hub unit.

A hub unit of the invention which solves the problem includes:

an outer ring member which is stationarily attached to a main body of a vehicle; and a hub body which is attached to a wheel of the vehicle and is disposed concentrically and rotatably with respect to the outer ring member around an axis of the hub body via rolling elements such that a rolling element arranging space is defined between the outer ring member and the hub body along an axial direction of the hub body;

wherein a seal member for sealing the rolling element arranging space is provided at one or both of end portions of the rolling element arranging space which lie in the axial direction on a vehicle-outer side end portion and a vehicle-inner side, whereby the rolling element arranging space is made to have a semi-hermetically closed construction which has no other leak path through which a gas within the rolling element arranging space leaks out to the outside of the hub unit than a sealing surface by the seal member; and an inert gas being filled in the rolling element arranging space.

According to the configuration above, since the semi-hermetically closed state is provided in which the inert gas is filled in the rolling element arranging space, further wear can be prevented which would otherwise be produced by the production of wear dust due to vibrations generated during transport and the oxidization of wear dust so produced. Namely, the generation of fretting wear can be prevented.

Furthermore, the seal member may be disposed to be elastically compressed between the outer ring member and the hub body, and the inert gas is filled in the rolling element arranging space in a pressurized state, and the seal member maintains a sealing state between the outer ring member and the hub body against a pressure generated by the pressurized inert gas. According to this configuration, the inert gas is filled in a pressurized state, so as to prevent the oxidization of the periphery of the rolling element arranging space, thereby making it possible to prevent the occurrence of fretting wear.

The seal member may double as a water intrusion preventive member which prevents an intrusion of water into the rolling element arranging space. According to this configuration, the semi-hermetically closed construction can be formed with ease by causing the water intrusion preventive member to double as the seal member. In addition, by causing the water intrusion preventive member to double as the seal member, the increase in production costs can be prevented.

The hub unit of the invention can also be made to be served in a driven wheel of the vehicle, and further includes the seal member disposed at the vehicle-outer side end portion of the rolling element arranging space and having a cover mounted at a vehicle-inner side end portion to prevent the inert gas filled in the rolling element arranging space from flowing out to the exterior space. According to this configuration, the inert gas can be left in such a state that the inert gas is filled in the rolling element arranging space by the cover, thereby making it possible to prevent the occurrence of fretting wear. In addition, by sealing an end portion of the hub unit which lies on the vehicle-inner side by the cover, the inert gas can be prevented from flowing out of the end portion of the hub unit which lies on the vehicle-inner side.

The hub unit of the invention can be made such that a gas filling hole is formed in the outer ring member so as to pass radially therethrough from an outer circumferential surface thereof into the rolling element arranging space, and the inert gas is filled from the gas filling hole, and the gas filling hole is closed with a sealing material after the inert gas is filled up. In addition, a configuration can be adopted in which the gas filling hole is made to function as a sensor arranging hole.

According to this configuration, by filling inert gas from the gas filling hole and sealing the gas filling hole with the sealing material, the rolling element arranging space can be left filled with the inert gas, thereby making it possible to prevent the occurrence of fretting wear. Furthermore, the gas filling hole can be sealed by disposing a sensor in the gas filling hole, and by making use of the sensor disposing hole in this way, the inert gas can be filled without adding a further step to the conventionally existing step.

First and second aspects of the method for manufacturing the hub unit of the invention which solves the problem is a method wherein a step of defining the rolling element arranging space by assembling together the outer ring member, the rolling elements, the hub body and the seal member or a step of defining the rolling element arranging space by assembling together the outer ring member, the rolling elements, the hub body, the seal member and the cover is implemented in an atmosphere which is filled with the inert gas for filling the rolling element arranging space.

According to these aspects of the method, the inert gas can be filled in the rolling element arranging space by assembling the hub unit in the atmosphere which is filled with the inert gas.

Third aspect of the method for manufacturing the hub unit of the invention which solves the problem is a method wherein the inert gas is filled in the rolling element arranging space by filling the inert gas from the gas filling hole formed in the outer ring member and the gas filling hole is then closed with the sealing material.

According to this method, the state in which the inert gas is filled in the rolling element arranging space is realized by sealing the gas filling hole with the sealing material, thereby making it possible to prevent the occurrence of fretting wear.

A method for transporting the hub unit of the invention which solves the problem is a method wherein the hub unit which is in such a state as to be assembled on to the vehicle body is transported in such a state that the inert gas is filled in the rolling element arranging space so that vibrations are applied to the hub unit. Even in such a state that vibrations are applied to the hub unit during transportation, since the inert gas is filled in the rolling element arranging space, the occurrence of fretting wear can be prevented.

DETAILED DESCRIPTION OF THE PREFERRED EMBODIMENTS

Hereinafter, embodiments of the invention will be described by reference to the drawings.

Embodiment 1

Figure 1:
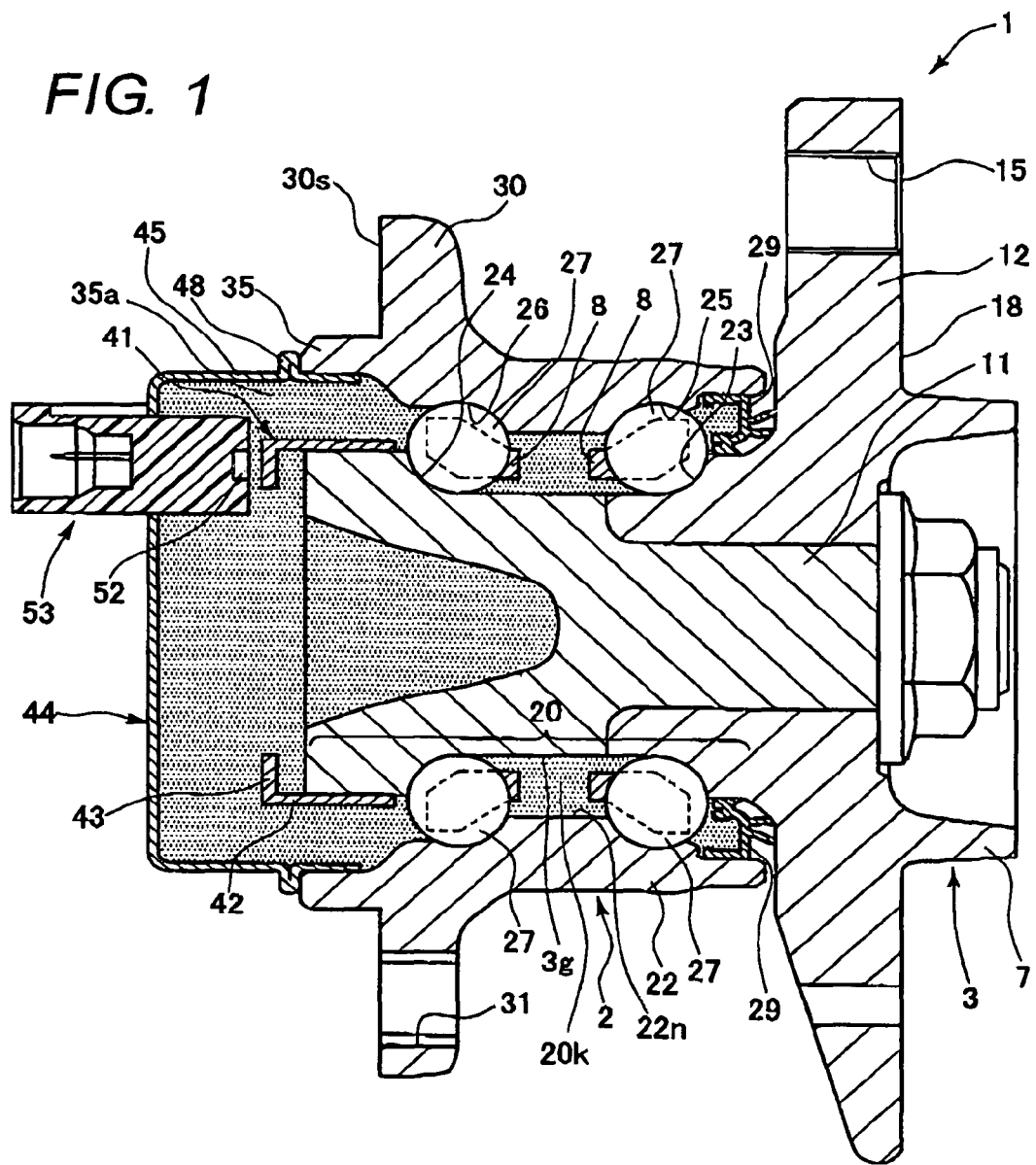
FIG. 1 is a sectional view showing a hub unit of Embodiment 1 of the invention.

FIG. 1 shows a hub unit 1 which constitutes an embodiment of the invention. Note that a right-hand side of the figure denotes a vehicle-outer side and a left-hand side denotes a vehicle-inner side. As is shown in FIG. 1, the hub unit 1 is configured to include a rolling element (an outer ring member) 2 and a hub body (an inner ring member) 3 which is disposed concentrically with the rolling element 2.

The hub body 3 has a shaft portion 11 which rotates round an axial center thereof and an annular hub flange 12 which is provided at an end portion of the shaft portion 11 which lies on a vehicle-outer side in such a manner as to project radially therefrom. The rolling element 2 which is made up of an angular ball bearing is mounted on an outer circumference of the shaft portion 11. The hub flange 12 is formed in such a manner as to project in the radial direction from an end portion of an outer circumferential surface of the hub body 3 which lies on the vehicle-outer side.

A brake disc rotor and a wheel are fixed to this hub flange 12, whereby the brake disc rotor and the wheel and the hub body 3 rotate together. Namely, a coupling rib portion 7 which guides radially the brake disc rotor and the wheel to their mounting positions when they are mounted is formed on a principal surface 18 of the hub flange 12 in such a manner as to project from the principal surface 18 in an axial direction of the hub flange 12 to the vehicle-outer side. A plurality of hub bolts which are passed through mating through holes 15 formed in the hub body 3 are passed through respective mounting holes formed in the brake disc rotor and the wheel while bringing the brake disc rotor and the wheel into abutment with the coupling rib portion 7 so as to be positioned relative to the hub flange 12, and a plurality of hub nuts are screwed on to the mating hub bolts, whereby the wheel is fixed to the hub body 3 together with the brake disc rotor. In addition, the hub body 3 is made of carbon steel for mechanical construction such as S55C through hot forging, and the coupling rib portion 7 is formed integrally with the hub body 3.

The rolling element 2 includes an outer ring 22 which constitutes a stationary ring, two rows of balls which are rolling elements which are arranged rollingly along inner ring raceways 23, 24 which are formed on the shaft portion 11 and outer ring raceways 25, 26 which are formed on the outer ring 22, crown-type cages 8 which retain the rows of balls 27, respectively, and a seal member 29 which is fixed to the outer ring 22 on the side of the hub flange 12 so as to be interposed between the outer ring 22 and the shaft portion 11.

A rolling element arranging space defining portion 20 is defined by an inner circumferential surface $22n$ of the outer ring 22 and an outer circumferential surface $3g$ of the hub body 3, and the two rows of balls 27 which constitute rolling elements are retained by the cages 8 within a rolling element arranging space $20k$ which is defined by the rolling element arranging space defining portion 20.

The outer ring 22 is made of carbon steel for mechanical construction such as S55C through hot forging, and an outer ring flange portion 30 is provided on an end portion of an outer circumferential surface of the outer ring 22 on the vehicle-inner side in such a manner as to project radially therefrom, bolt through holes 31 through which bolts are passed being formed in predetermined positions on the outer ring flange portion 30.

A hub side coupling rib portion 35 whose inner circumferential surface defines an opening $35a$ is formed on a principal surface $30s$ of the outer flange portion 30 which lies on the vehicle-inner side in such a manner as to project axially towards the vehicle-inner side.

A sensor rotor 41 having a detectable portion is fixedly press fitted on the hub body 3. A cover 44 on which a magnetic sensor 53 functioning as a rotary detector is provided is press fitted in the outer ring 22. The cover 44 has a stopper portion 48 which is formed on a radially outer side of a cylindrical portion 45 which is formed into a cylindrical shape and is mounted on an inner circumferential surface of the hub side coupling rib portion 35. The sensor rotor 41 is made up of an annular core metal 42 and a magnetic material 43. In addition, the magnetic sensor 53 is made up of a magnetic detecting device 52 and the like. The rotational speed and rotation direction of the wheel are detected by this rotary detector.

The hub unit 1 is made to be used on a driven wheel side of the vehicle body, have the cover 44 mounted at the end portion thereof which lies on the vehicle-inner side and include a nitrogen gas, functioning as an inert gas, filled in the rolling element arranging space $20k$, whereby the nitrogen gas is sealed therein in a semi-hermetically closed state by the seal member 29 and the cover 44 so that no nitrogen gas is allowed to flow out to an exterior space. The seal member 29 that is provided at the end portion of the rolling element arranging space which lies on the vehicle-outer side is formed as an elastic sealing element, and is fixed to the outer ring 22 at one end while being tightly secured to the other end thereof while being elastically deformed, thereby enabling the inert gas to be filled in the rolling element arranging space 20*k* in a pressurized state. In addition, the seal member 29 has a function not only to maintain a sealing state between the outer ring 22 and the hub body 3 against a pressure generated by the pressurized inert gas but also to prevent the intrusion of water from the exterior space into the rolling element arranging space 20*k*. Namely, the seal member 29 is made to double as a water intrusion preventive member. This seal member 29 maintains the inert gas filled in the rolling element arranging space 20*k* in the semi-hermetically closed state to thereby prevent the inert gas so filled from flowing out to the outside. A construction is thus realized in which no other leak path of the inert gas than the sealing surface by the seal member 29 is provided.

Since the nitrogen gas is filled in the rolling element arranging space 20*k*, when assembled to vehicles 91 such as automobiles for transportation by a train 90 or boat (refer to FIG. 7), with the hub unit 1 configured as has been described heretofore, wear dust produced due to fretting wear caused by minute vibrations is prevented from being oxidized to produce iron oxide, the expansion of false brinelling being thereby prevented. Note that in order to prevent the generation of false brinelling by fretting wear, the state only has to be maintained in which the nitrogen gas is sealed in the rolling element arranging space in the semi-hermetically closed condition during transportation of the vehicles 91.

Figure 2:
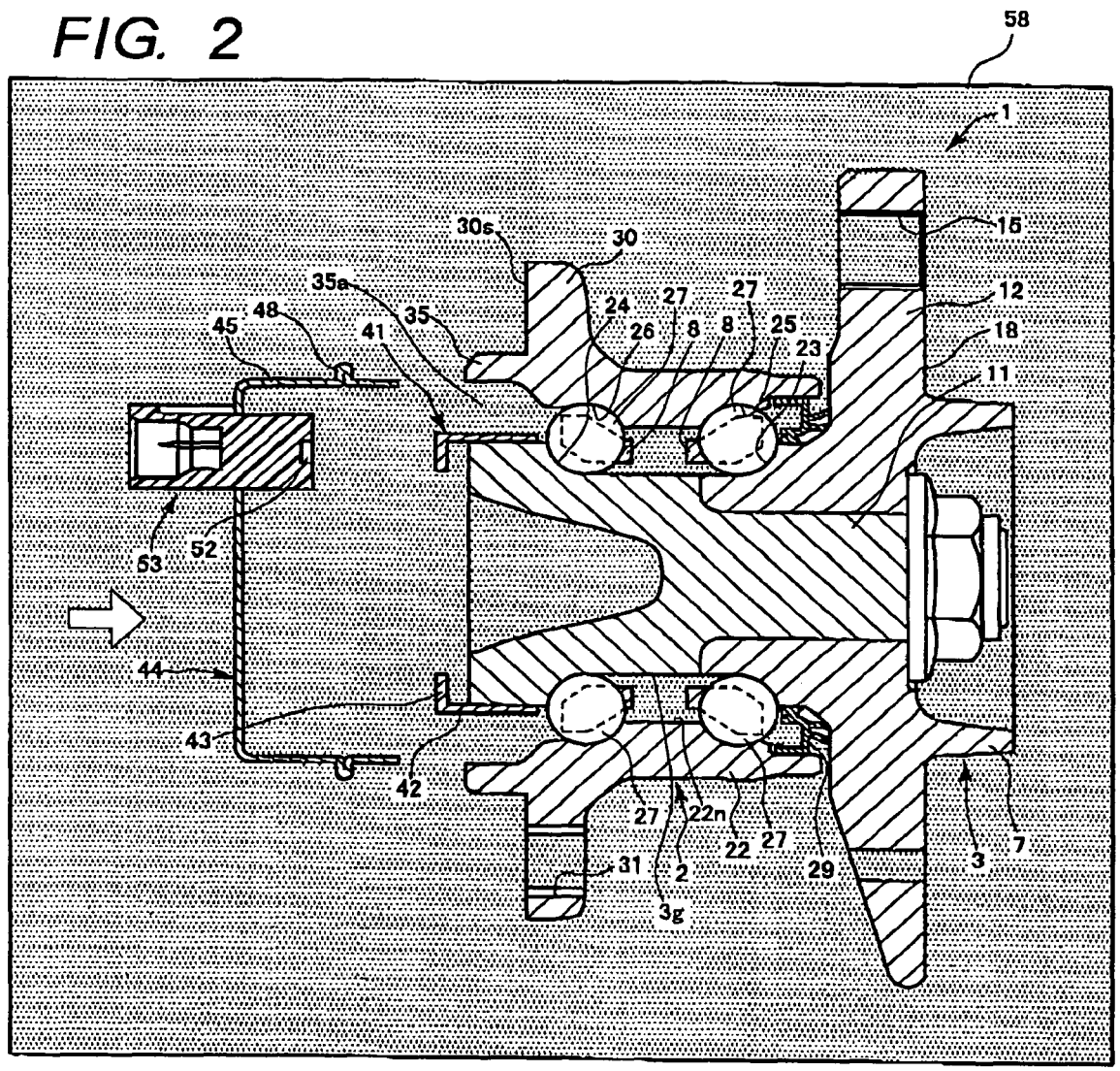
FIG. 2 is a sectional view which describes a method for manufacturing the hub unit of Embodiment 1.

A method will be described by reference to FIG. 2 for manufacturing the hub unit 1 in which the nitrogen gas is sealed in the semi-hermetically closed state.

The seal member 29 is mounted on the end portion of the rolling element arranging space 20*k* between the outer ring 22 and the hub body 3 which lies on the vehicle-outer side in the axial direction thereof, so that the outer ring 22 is integrated with the hub body 3. Then, the hub unit 1 is introduced into a chamber 58 which is filled with the nitrogen gas which constitutes the inert gas in such a state that the outer ring 2 and the hub body 3 are integrated with each other, and the cover 44 is press fitted in the inner circumferential surface 22*n* of the outer ring 22 at the end portion thereof of the vehicle-inner side, whereby the inert gas is filled in the rolling element arranging space 20*k* of the hub unit 1 in a closed fashion. Note that a rare gas such as argon may be used in place of nitrogen gas as the inert gas.

Embodiment 2

By the use of FIG. 3, a hub unit 60 of Embodiment 2 will be described in which a seal member constitutes a water intrusion preventive member and is provided at both end portions of a rolling element arranging space 20*k* which end portions lie on an inner side and an outer side of a vehicle, respectively.

A hub body 3 has an inner ring 21 whose inner circumferential surface is made to constitute a mounting surface on to an axle 70 and which is used in such a manner as to rotate together with the axle 70, an outer ring 22 which is disposed on an outer side of the inner ring 21 concentrically therewith and is mounted on an object mounting portion 71 on the automobile side in such a manner as not to rotate round the axle 70 for use and a plurality of rolling elements 27 which are disposed between the inner ring 21 and the outer ring 22. A radially outwardly oriented outer ring flange portion 30 is provided on an outer circumference of the outer ring 22, and the outer ring 22 is fixed to the object mounting portion 71 on the automobile side via this outer ring flange portion 30 via bolts 72. Namely, this hub unit 60 is used with the outer ring 22 made not to rotate whereas the inner ring 21 made to rotate.

Figure 3:
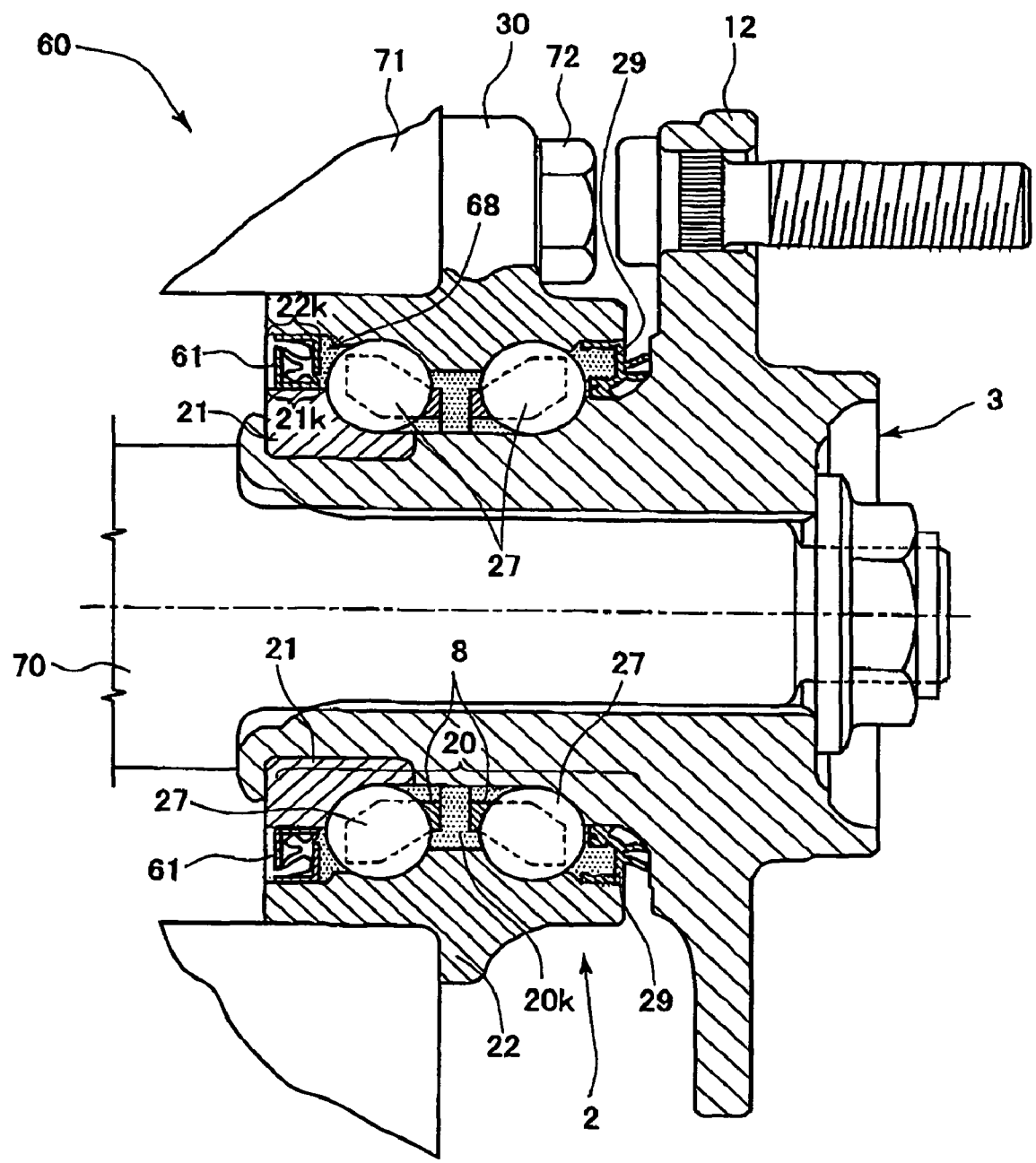
FIG. 3 is a sectional view showing a hub unit of Embodiment 2 of the invention.

In a construction shown in FIG. 3, ends of the bearing rings (the inner ring 21, the outer ring 22) where clearance defining portions 21*k*, 22*k* are formed are not covered with a cover or the like but are exposed to the outside, and therefore, there may occur a case where the relevant ends of the bearing rings are splashed with water that is scattered round strongly by an automobile which constitutes an object on which the hub unit is mounted when the vehicle runs through a pool of water on the road or is washed. As is shown in FIG. 3, in Embodiment 2, a seal member 61 is disposed in a clearance 68 for preventing the intrusion of such water into the interior of the bearing. Namely, an inner ring side seal ring 63 and an outer ring side seal ring 62 are disposed on circumferential surfaces of the bearing rings at portions which faces the clearance 68 defined between the inner ring side clearance defining portion 21*k* and the outer ring side clearance defining portion 22*k*, and an elastic seal element 65 is disposed between the inner ring side seal ring 63 and the outer ring side seal ring 62 for preventing the intrusion of water into the interior of the bearing from the clearance 68.

Figure 4:
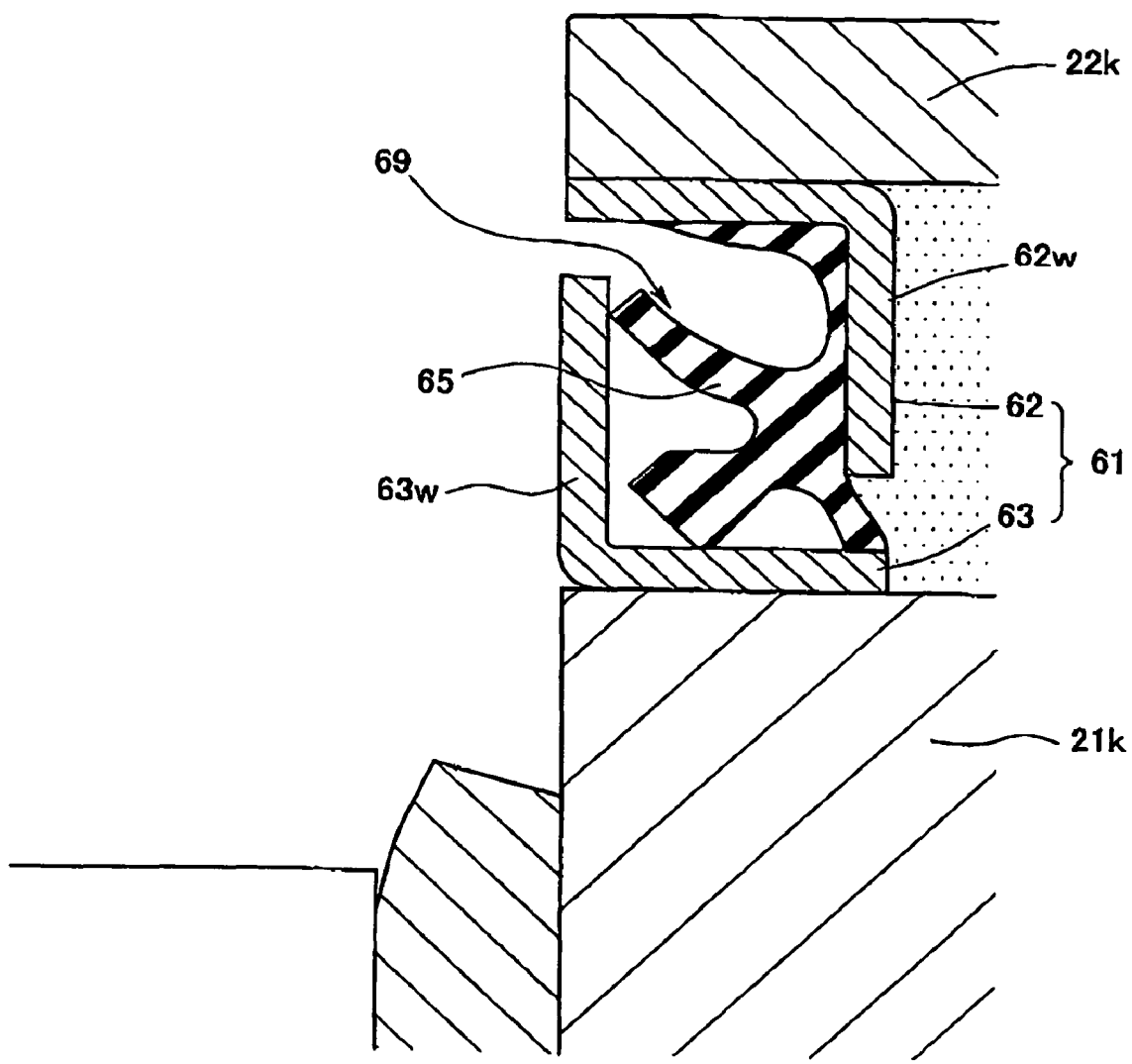
FIG. 4 is a sectional view showing a main part of FIG. 3.

To describe specifically, as is shown in FIG. 4, the outer ring side seal ring 62, which has an outer ringside seal wall portion 62*w* which projects radially inwards from the inner circumferential surface of the outer ring side clearance defining portion 22*k*, is mounted on the inner circumferential surface. In addition, the inner ring side seal ring 63, which has an inner ring side seal wall portion 63*w* which projects radially outwards from the outer circumferential surface of the inner ring side clearance defining portion 21*k*, is mounted on the outer circumferential surface. Each of these seal rings 62, 63 has an L-shaped cross section. The inner ring side seal wall 63*w* is disposed in such a manner as not only to be nearer to an axial end face of the inner ring side clearance defining portion 21*k* than the outer ring side seal wall 62*w* and but also to define a certain determined seal clearance 69 in the axial direction between the outer ring side seal wall 62*w* and itself, whereby the elastic seal element 65 is disposed in the seal clearance 69. In addition, the elastic seal element 65 is bonded to an inner surface of the outer ring side seal ring 62.

By the configuration described above, nitrogen gas is filled in the rolling element arranging space 20*k* of the hub unit 60 and is then sealed therein in a semi-hermetically closed state by the seal members 29, 61, whereby when the hub unit 60 is assembled to a vehicle such as an automobile, which is transported by the train 90 or boat, wear dust produced by fretting wear generated by minute vibrations is prevented from being oxidized to produce iron oxide, whereby the occurrence of false brinelling is prevented. Note that the filling and sealing in the semi-hermetically closed state of nitrogen gas in the rolling element arranging space 20*k* is implemented in a similar manner to that of Embodiment 1, in which the hub unit 60 is introduced into a chamber 58 filled with nitrogen gas, and the seal member 61 is mounted on the inner circumferential surface 22*n* of the end portion of the outer ring 22 which lies on the vehicle-outer side in place of the cover 44, whereby the inert gas is filled in the rolling element arranging space 20*k* of the hub unit 60 in the semi-hermetically closed state.

Embodiment 3

Figure 5:
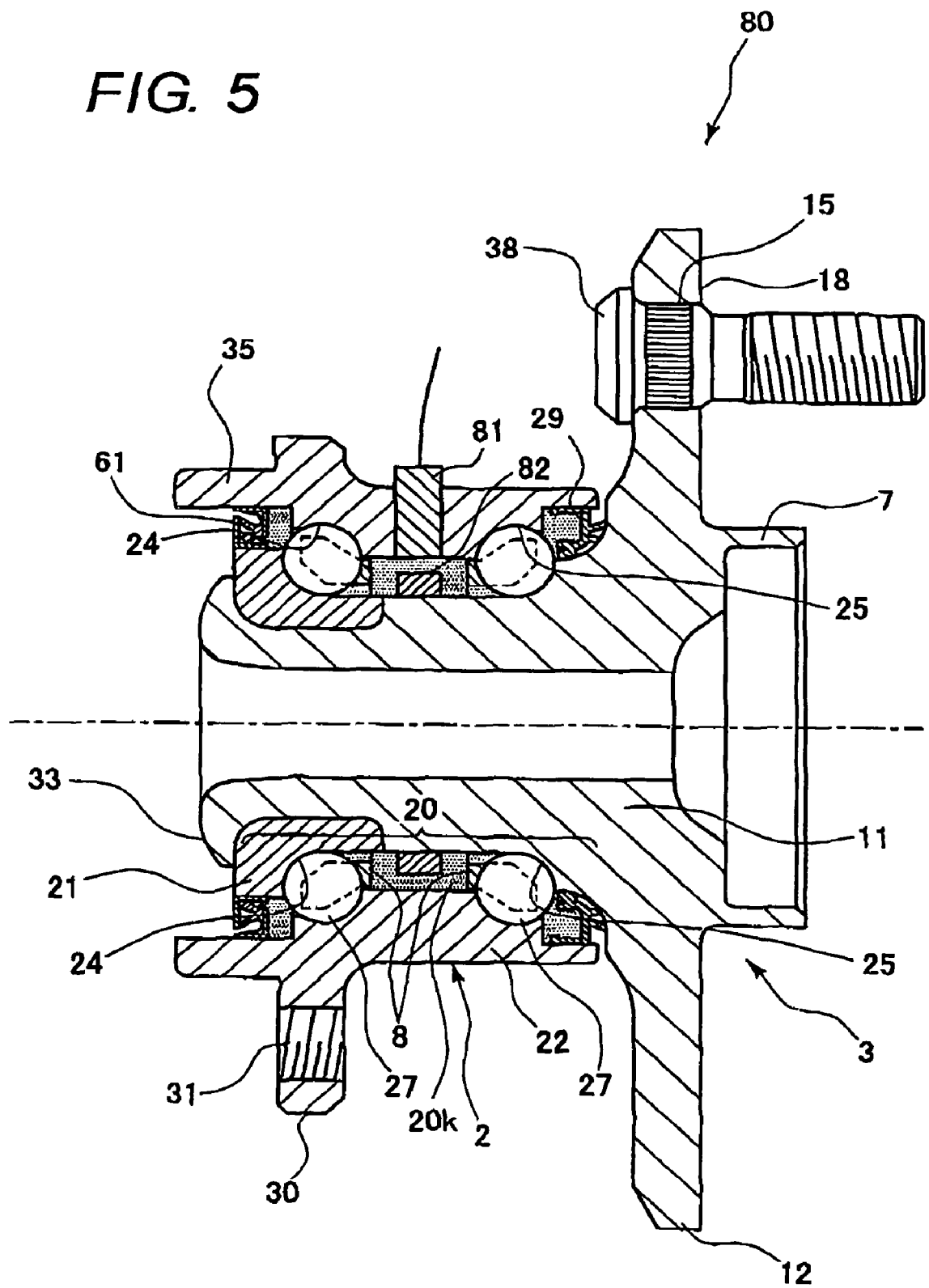
FIG. 5 is a sectional view showing a hub unit of Embodiment 3 of the invention.

A hub unit 80 of Embodiment 3 will be described using FIG. 5. a seal member 29 is disposed at an end portion of a rolling element arranging space 20k which lies on an vehicle-outer side, and a seal member 61 is disposed at an end portion of the same space on the vehicle-inner side, and nitrogen gas is filled in the rolling element arranging space 20k as the inert gas to thereby be sealed therein by the seal members 29, 61.

A through hole 83 is formed in an outer ring 22 in such a manner as to pass through from an outer circumferential surface of the outer ring 22 into the rolling element arranging space 20k, and a sensor 81 is fitted in the through hole 83. Namely, the through hole 83 constitutes a sensor arranging hole. A pulser ring 82 is mounted on an outer circumferential surface of a hub body at a portion which faces the sensor 81. A vehicle speed can be measured by the sensor 81 and the pulser ring 82.

Figure 6:
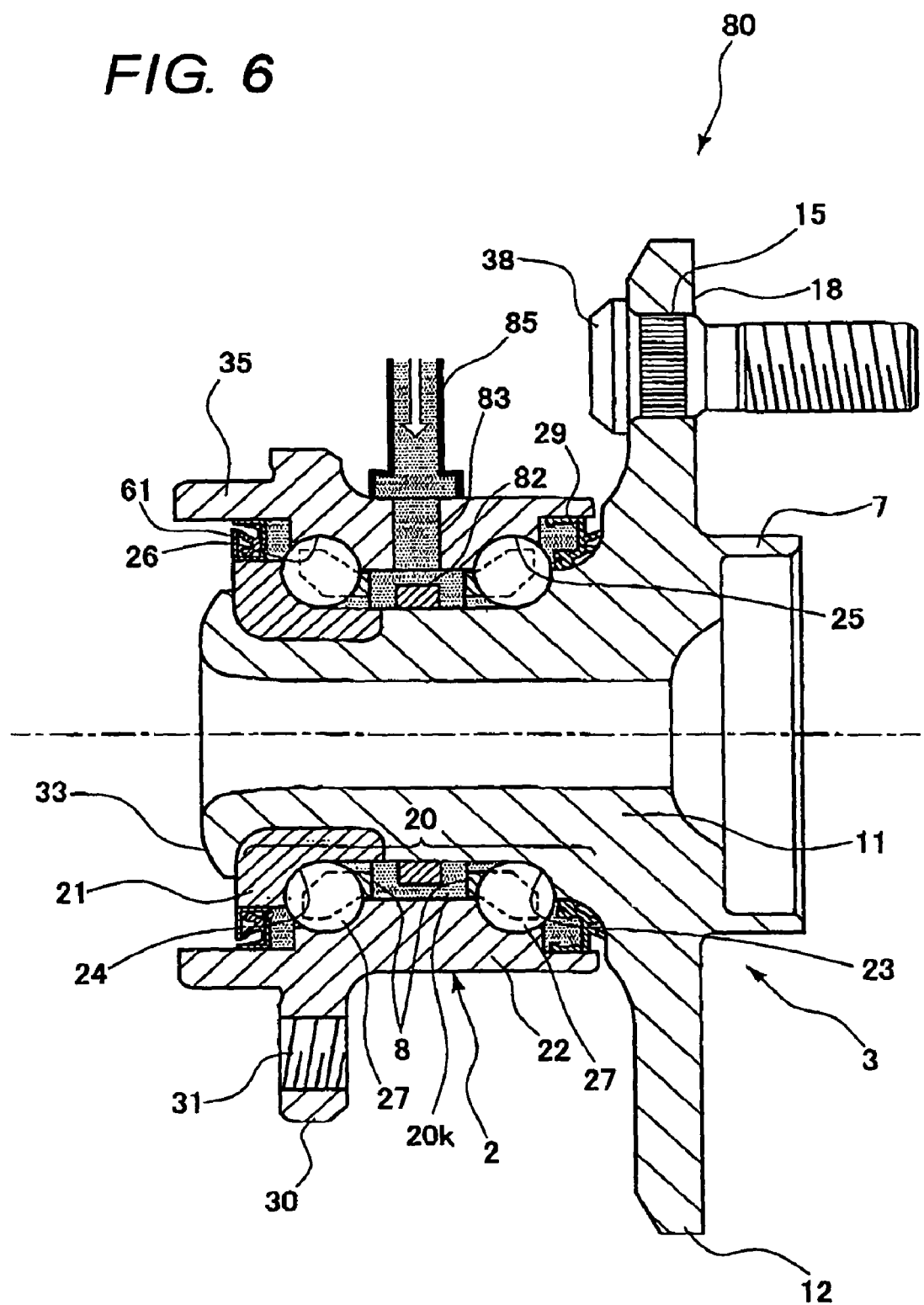
FIG. 6 is a diagram which describes a method for manufacturing the hub unit of Embodiment 3.

A method for manufacturing the hub unit 80 of Embodiment 3 will be described by reference to FIG. 6. A nitrogen gas introduction, tube 85 is brought into abutment with the through hole 83 in the hub unit 80, and nitrogen gas is introduced into the rolling element arranging space 20k via the nitrogen gas introduction tube 85. By fitting the sensor 81 in the through hole 83, the nitrogen gas so introduced is sealed in the rolling element arranging space 20k in a semi-hermetically closed state. Namely, the through hole 83 constitutes a gas filling hole. Note that a paste-like sealing material that can set may be filled in the through hole 83 to seal the hole 83. In Embodiment 3, while the hub unit 80 is described as being provided with the seal members which are disposed at both the end portions of the rolling element arranging space 20k which end portions lie on the vehicle-inner side and vehicle-outer side, the embodiment can be applied to a hub unit in which a cover is provided at the end portion which lies on the vehicle-inner side.

Figure 7:
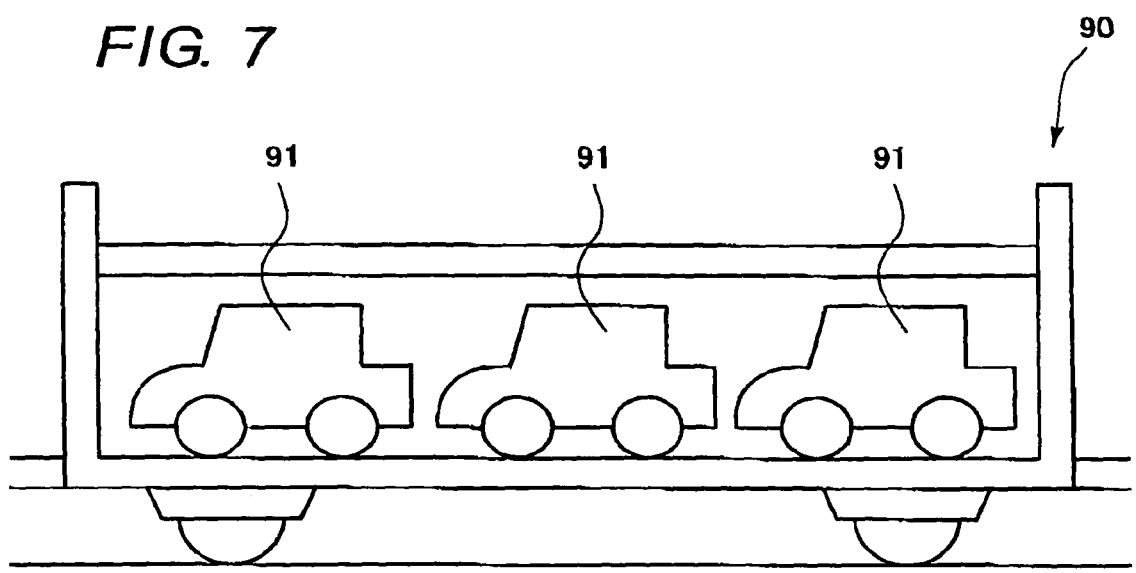
FIG. 7 is a diagram showing a method for transporting hub units which are transported in such a state that they are mounted on vehicles.

Thus, with the hub units 1, 60, 80 that have been described heretofore, by the sealing of the nitrogen gas in the rolling element arranging space 20k in the semi-hermetically closed state, when they are assembled to vehicles 91 such as automobiles which are transported, as is shown in FIG. 7, by the train 90, boat, truck or the like, wear dust produced by fretting wear generated by minute vibrations (in particular, radial vibrations constitute the cause for fretting wear, but the cause is not limited thereto) is prevented from being oxidized to produce iron oxide, whereby the occurrence of false brinelling is prevented.

Test Example

Next, the results of a test will be described which was carried out to verify the advantage of the invention. In order to verify the effect of preventing the production of false brinelling in the hub units 1, 60, 80 in which the nitrogen gas is sealed in the rolling element arranging space 20k in the semi-hermetically closed state, a test was carried out on wear in the atmosphere of nitrogen.

The construction of hub units used in the test was such as to correspond to the construction of the hub unit 1 of Embodiment 1 in which a seal member 29 was mounted at an end portion of a rolling element arranging space 20k which end portion lay on a vehicle-outer side, and a cover 44 was mounted at an end of the hub unit which end lay on an inner side of the vehicle. The test was carried out under the following test conditions; the hub units were oscillated while applying thereto a radial load of 7.02 kN+/−3.51 kN and an axial load of 0 kN+/−2.18 kN 1×10$^6$ times, and wear then was measured. Note that the hub units used in the test had no difference in axial interior clearance. The results of the test are shown in Table 1.

TABLE 1

| TEST | | MAXIMUM WEAR DEPTH (μm) | |
|---|---|---|---|
| | | INNER RING | OUTER RING |
| A | 1 | 6 | 14 |
| | 2 | 25 | 8 |
| B | 1 | 0 | 2 |
| | 2 | 2.5 | 1.5 |
| C | 1 | 2.5 | 2 |
| | 2 | 2 | 2 |

Test A was a fretting test using the hub unit which was normal and filled with no nitrogen gas. Test B was a fretting test carried out by displacing the hub unit under a nitrogen gas atmosphere and continuously injecting nitrogen gas to produce a normally nitrogen atmosphere environment. Test C was a fretting test in which the cover 44 was mounted on the rolling element arranging space 20k of the hub unit in a nitrogen gas atmosphere so as to seal the nitrogen gas therein, and then the hub unit was disposed in the air for testing. Consequently, Test C corresponds to the hub unit 1 of Embodiment 1, and Test A corresponds to a related art hub unit. Each test was carried out twice, and the results thereof are shown in two upper and lower boxes.

The maximum wear depth denotes the depth of a maximum damage among damages caused by wear.

The maximum wear depth of Test C denotes a small value compared to that of Test A carried on the related art hub unit and it indicates that fretting wear is prevented effectively by filling and sealing nitrogen gas in the rolling element arranging space 20k. In addition, the test results of Test C were similar to the test result of Test B which was carried out under the normally nitrogen atmosphere environment and indicate that fretting wear is prevented effectively by the hub unit in which nitrogen is filled and sealed in the semi-hermetically closed state.

As has been described heretofore, the occurrence of false brinelling resulting from fretting wear caused during transportation by the train 90 or boat can be prevented by filling and sealing the inert gas in the rolling element arranging space 20k.

What is claimed is:

1. A method for manufacturing a hub unit, said method comprising:
   providing an outer ring member;
   providing a hub body which is disposed concentrically and rotatably with respect to the outer ring member around an axis of the hub body on a plurality of rolling elements such that a rolling element arranging space is defined between the outer ring member and the hub body along an axial direction of the hub body;
   providing a seal member for sealing the rolling element arranging space provided at one or both of a plurality of end portions of the rolling element arranging space in relation to the axial direction of the hub body, whereby the rolling element arranging space comprises a semi-hermetically closed construction which has no other leak path through which a gas within the rolling element arranging space leaks out to the outside of the hub unit than a sealing surface by the seal member;
   providing an inert gas in the rolling element arranging space; and
   defining the rolling element arranging space by assembling together the outer ring member, the plurality of rolling elements, the hub body and the seal member, wherein the defining the rolling element arranging space is implemented in an atmosphere which is filled with the inert gas for filling in the rolling element arranging space.

2. A method for manufacturing a hub unit, said method comprising:

providing an outer ring member which is stationarily attached to a main body of a vehicle;

providing a hub body which is attached to a wheel of the vehicle and is disposed concentrically and rotatably with respect to the outer ring member around an axis of the hub body on a plurality of rolling elements such that a rolling element arranging space is defined between the outer ring member and the hub body along an axial direction of the hub body;

providing a seal member for sealing the rolling element arranging space provided at a vehicle-outer side end portion of the rolling element arranging space and including a cover mounted at a vehicle inner-side end portion to prevent an inert gas filled in the rolling element arranging space from flowing out to a space outside the seal member, whereby the rolling element arranging space comprises a semi-hermetically closed construction which has no other leak path through which a gas within the rolling element arranging space leaks out to the outside of the hub unit than a sealing surface by the seal member;

providing an inert gas in the rolling element arranging space; and defining the rolling element arranging space by assembling together the outer ring member, the plurality of rolling elements, the hub body, the seal member and the cover, wherein the hub unit is formed in a driven wheel of the vehicle, and wherein the defining of the rolling element arranging space is implemented in an atmosphere which is filled with the inert gas for filling the rolling element arranging space.

* * * * *